United States Patent
Juzak et al.

(10) Patent No.: US 10,295,086 B2
(45) Date of Patent: May 21, 2019

(54) PIPE HANGER

(71) Applicant: J. van Walraven Holding B.V., Mijdrecht (NL)

(72) Inventors: Marek Juzak, Mijdrecht (NL); Frank Nijdam, Zeewolde (NL)

(73) Assignee: J. van Walraven Holding B.V., Mijdrecht (NL)

( * ) Notice: Subject to any disclaimer, the term of this patent is extended or adjusted under 35 U.S.C. 154(b) by 0 days.

(21) Appl. No.: 16/068,384

(22) PCT Filed: Jan. 16, 2017

(86) PCT No.: PCT/NL2017/050020
§ 371 (c)(1),
(2) Date: Jul. 6, 2018

(87) PCT Pub. No.: WO2017/126957
PCT Pub. Date: Jul. 27, 2017

(65) Prior Publication Data
US 2019/0017630 A1    Jan. 17, 2019

(30) Foreign Application Priority Data
Jan. 19, 2016 (NL) ..................................... 2016119

(51) Int. Cl.
*F16L 3/10* (2006.01)
*F16L 3/11* (2006.01)

(52) U.S. Cl.
CPC ............... *F16L 3/11* (2013.01); *F16L 3/1075* (2013.01)

(58) Field of Classification Search
USPC ........................................................... 248/62
See application file for complete search history.

(56) References Cited

U.S. PATENT DOCUMENTS

| | | | | |
|---|---|---|---|---|
| 2,466,247 A | * | 4/1949 | Land ......................... | F16L 3/14 248/62 |
| 2,671,625 A | * | 3/1954 | Buckley ..................... | F16L 3/11 248/58 |
| 2,714,497 A | | 8/1955 | Denis | |
| 3,623,686 A | * | 11/1971 | Dupuis ..................... | F16L 3/11 248/60 |

(Continued)

FOREIGN PATENT DOCUMENTS

| EP | 2156083 B1 | 7/2015 |
|---|---|---|
| FR | 2906002 A1 | 3/2008 |

*Primary Examiner* — Monica E Millner
(74) *Attorney, Agent, or Firm* — Hoffmann & Baron, LLP

(57) ABSTRACT

A pipe hanger includes generally U-shaped upper and lower hanger parts, and a locking bolt for interconnecting the upper and lower part. The lower hanger part has a saddle portion for supporting a pipe. One of the arms of the upper hanger part has a hook formed on a lower end. The corresponding arm of the lower hanger part has an aperture that is arranged over the hook. The same arm of the lower hanger part has at its end a tilt limiting abutment. In an open state of the pipe hanger the lower hanger part can be suspended from the hook and is allowed to swivel until the tilt limiting abutment abuts the corresponding arm of the upper hanger part. The other arm of the lower hanger part has a bore for the locking bolt to lock the lower hanger part and upper hanger part in the closed position.

12 Claims, 5 Drawing Sheets

(56) References Cited

U.S. PATENT DOCUMENTS

| | | | | |
|---|---|---|---|---|
| 5,848,770 A | * | 12/1998 | Oliver | E21F 17/02 |
| | | | | 248/58 |
| 6,138,960 A | * | 10/2000 | Carbonare | F16L 3/1083 |
| | | | | 248/62 |
| 7,490,388 B2 | * | 2/2009 | van Walraven | F16B 2/10 |
| | | | | 24/285 |
| 8,322,662 B2 | | 12/2012 | Heath et al. | |
| 2012/0160970 A1 | * | 6/2012 | Bragagna | F16L 3/11 |
| | | | | 248/62 |

* cited by examiner

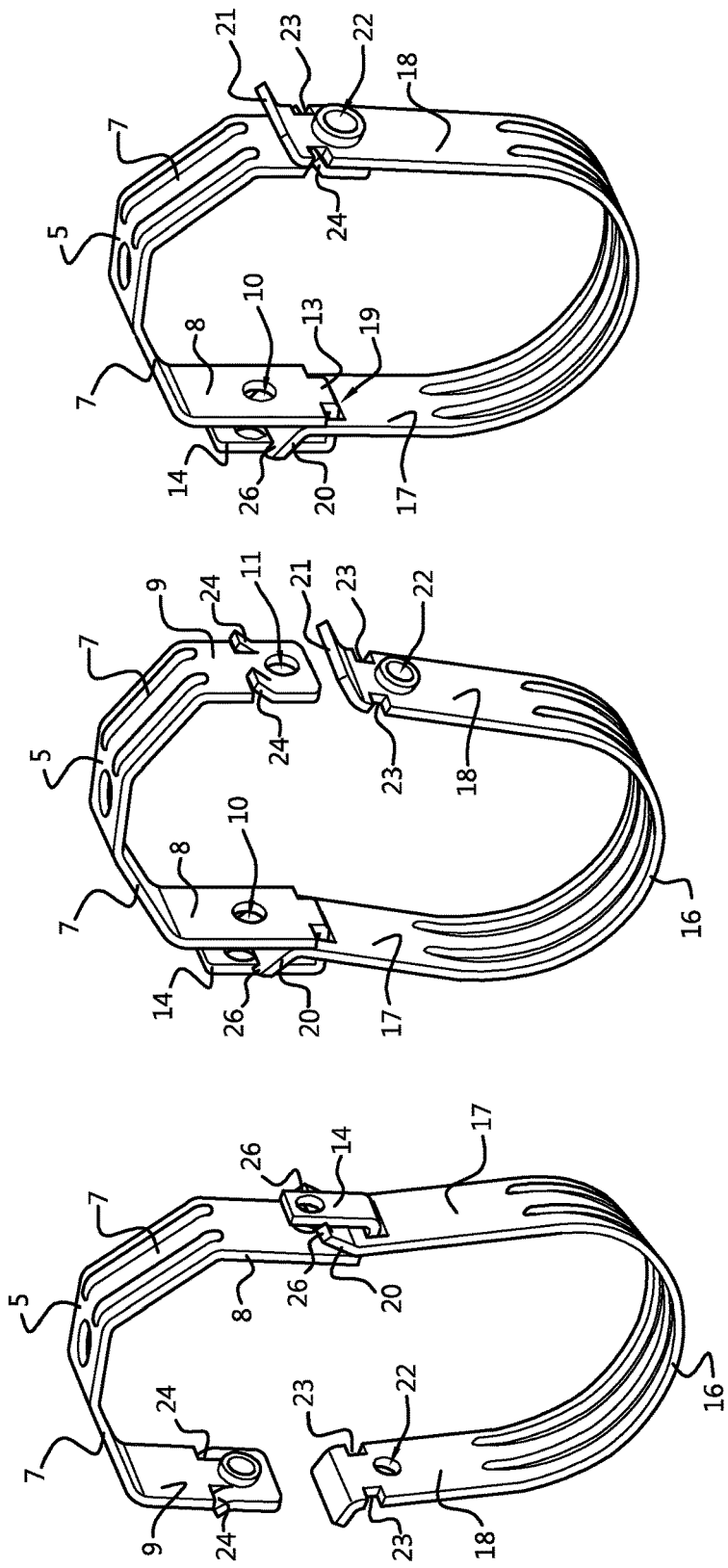

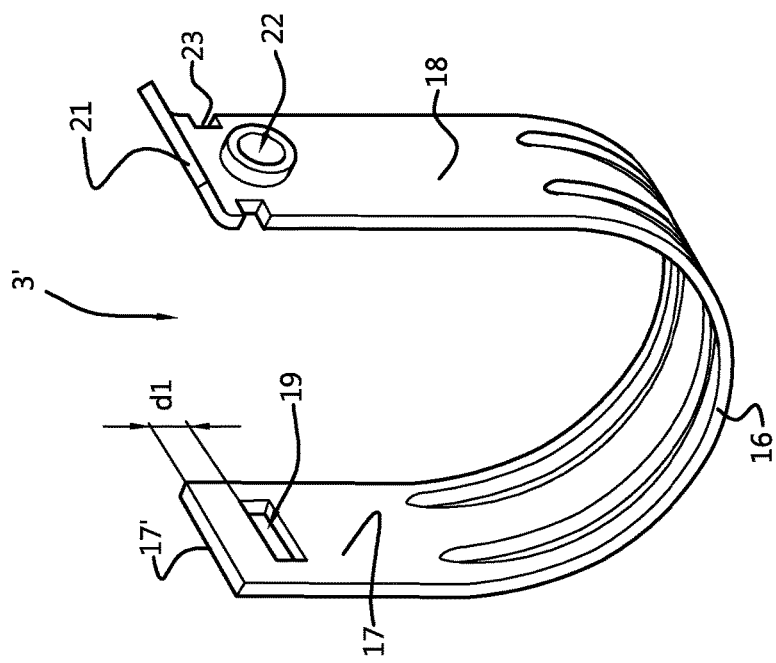
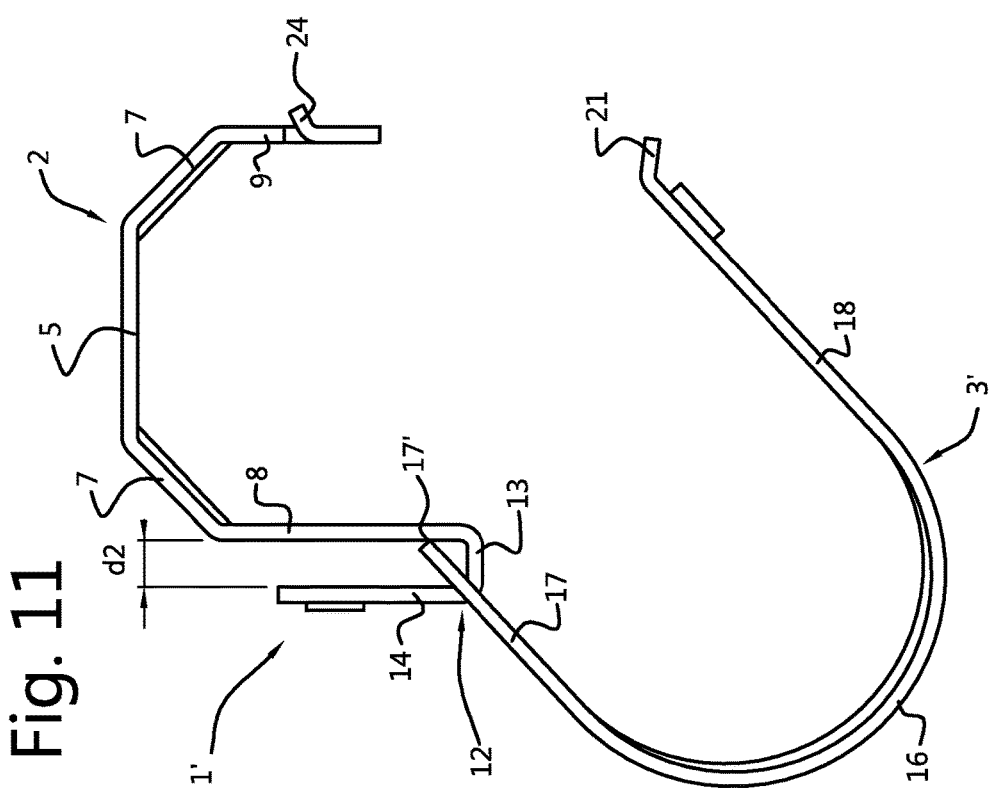

PIPE HANGER

CROSS-REFERENCE TO RELATED APPLICATIONS

This application is the National Stage of International Application No. PCT/NL2017/050020, filed Jan. 16, 2017, which claims the benefit of Netherlands Application No. NL 2016119, filed Jan. 19, 2016, the contents of which is incorporated by reference herein.

FIELD OF THE INVENTION

The present invention relates to a pipe hanger comprising an upper hanger part, a lower hanger part and a locking bolt, said upper hanger part being adapted to be mounted to a support member and having depending arms each having a bore through which the locking bolt extends, and said lower hanger part having a saddle portion for supporting a pipe and arms extending upwardly from the saddle portion, wherein in a closed state of the pipe hanger the depending arms of the upper hanger part are coupled to the corresponding arms of the lower hanger part.

BACKGROUND OF THE INVENTION

A pipe hanger is known from U.S. Pat. No. 2,714,497. Such hangers are also known as "Clevis hangers". The Clevis hanger has a round hole in the upper hanger part, through which the hanger can be attached to a threaded rod suspended from a ceiling or other overhead support. The upper hanger part is attached to the rod by means of two nuts. After that the lower part of the hanger can be fastened to the upper part. The upper hanger part and lower hanger part are separated completely and the pipe is laid into the lower hanger part. The holes in the legs of the upper and lower hanger parts are aligned and then the locking bolt has to be inserted to close the hanger and connect the upper and lower hanger parts. While this structure with a transverse bolt extending through the hanger provides a rigid and solid hanger, the installation of the hanger may be cumbersome, because the weight of the pipe is already resting on the lower hanger part and the user has to hold the lower part with the pipe resting on it while the bolt is inserted.

U.S. Pat. No. 8,322,662 discloses in FIGS. 8-20 a pipe hanger without a locking bolt. This known pipe hanger instead has a snap closed feature which provides an easier installation than the hanger of U.S. Pat. No. 2,714,497. The lower hanger part is on one side pivotally connected to the upper hanger part such that a pipe can be supported by the lower hanger part when the hanger is still in an open state. The lower part can then be pivoted upward with the pipe and snap closed. The snap closing structure of this pipe hanger requires however that the lower hanger part is bendable such that the legs of the lower part can be compressed together. This pipe hanger provides a less rigid and less solid hanging structure for the pipe.

The invention has for an object to provide a pipe hanger which allows an easier installation as the known Clevis hanger while at the same time it constitutes a rigid and solid structure when the hanger is installed with a pipe in it.

SUMMARY OF THE INVENTION

The invention relates to a pipe hanger comprising an upper hanger part, a lower hanger part and a locking bolt, said upper hanger part being adapted to be mounted to a support member and having depending arms each having a bore through which the locking bolt extends, and said lower hanger part having a saddle portion for supporting a pipe and arms extending upwardly from the saddle portion, wherein in a closed state of the pipe hanger the depending arms of the upper hanger part are coupled to the corresponding arms of the lower hanger part, wherein one of the depending arms of the upper hanger part has a hook formed on a lower end, and wherein the corresponding upwardly extending arm of the lower hanger part has an aperture formed in it that is arranged over the hook, wherein the same upwardly extending arm of the lower hanger part has at its end a tilt limiting abutment wherein in an open state of the hanger the lower hanger part only is suspended from the hook and is allowed to swivel until the tilt limiting abutment abuts the corresponding depending arm of the upper hanger part, and wherein the other one of said upwardly extending arms of the lower hanger part has a bore for the locking bolt to lock the lower part and upper part in the closed position.

The pipe hanger according to the invention combines an easy installation with a solid support for the pipe after it is installed. The pivot structure that allows swiveling to a maximum angle determined by the tilt limiting abutment allows that a pipe can be arranged in the lower hanger part and supported by it without a user having to keep hold of it. The user can than easily swivel the other side of the lower hanger part upward and then pass the locking bolt through the bore of the upwardly extending arm to lock the hanger in the closed state.

In a preferred embodiment the abutment is constituted by a flange that extends outwardly under an obtuse angle with the upwardly extending arm.

The obtuse angle may be within the range 100°-130°. Preferably the obtuse angle is around 120°. This angle provides that the hanger can be opened enough such that a pipe of a considerable diameter can be introduced in the hanger, but that the lower hanger part remains in a tilted position in which the pipe cannot roll out of the lower hanger part.

In a possible embodiment the tilt limiting flange has at its distal end two protrusions formed on it, wherein in a closed state of the hanger an upwardly extending hook portion is received between said protrusions.

In a possible embodiment the hook has a transverse portion that extends from the depending arm of the upper part in a transverse direction and wherein the hook has an upwardly extending portion that extends upwardly from the transverse hook portion and is spaced apart from said depending leg, and wherein there is a distance between an upper edge of the aperture and the abutment, which distance exceeds the distance between the depending leg and the upwardly extending hook portion. The abutment may be formed as a flange, but may for example also be formed by an upper edge of the arm concerned. Also other forms of the abutment are possible.

In a further embodiment the hook has generally an L-shape, wherein the end of the horizontal leg of the L is said transverse hook portion and is connected to the depending leg of the upper hanger part, and wherein the vertical leg of the L is said upwardly extending hook portion, which preferably extends parallel to the depending leg of the upper hanger part.

In a further embodiment, when the tilt limiting abutment abuts the depending arm of the upper hanger part, the aperture in the corresponding upwardly extending arm is located at the angle of the L-shape.

In a possible embodiment the upwardly extending hook portion is provided with a bore aligned with said bores in the depending arms, wherein the bolt extends through said aligned bores in the depending arms and the upwardly extending hook portion. The bolt is secured to the upper part, thus the bolt locks up the upper end of the upwardly extending arm of the lower part on the hook, whereby the lower part is secured to the upper part as well and cannot be lost. This is the state in which the hanger according to the invention is advantageously delivered to the user such that the user does not have to assemble the hanger from the separate parts.

In a further possible embodiment at least two of the bores are threaded bores adapted to cooperate with a male thread on the shank of the bolt.

In a possible embodiment the depending arm that opposes the depending arm where the hook is provided, has at least one outwardly extending barb, and the corresponding upwardly extending arm of the lower part has at least one recess to receive the at least one barb in a closed state of the hanger.

Another aspect of the invention relates to a pipe hanger comprising an upper hanger part and a lower hanger part, said upper hanger part being adapted to be mounted to a support member and having depending arms, and said lower hanger part having a saddle portion for supporting a pipe and arms extending upwardly from the saddle portion, wherein in a closed state of the pipe hanger the depending arms of the upper hanger part are coupled to the corresponding arms of the lower hanger part. One of the depending arms of the upper hanger part has a hook formed on a lower end, said hook having a transverse portion that extends from the depending arm of the upper part in a transverse direction and having an upwardly extending portion that extends upwardly from the transverse hook portion and being spaced at a distance from said depending arm. The corresponding upwardly extending arm of the lower hanger part has an aperture formed in it that is arranged over the hook. There is a distance between an upper edge of said aperture and an abutment located at the end of said upwardly extending arm, which distance exceeds the distance between the depending arm of the upper part and the upwardly extending hook portion.

According to this aspect of the invention the lower hanger part is allowed to pivot at the transverse portion of the hook formed on the upper part. However the pivotal movement or tilting is limited by the fact that the distance between the upwardly extending portion of the hook and the corresponding depending arm is smaller than the distance between the upper edge of the aperture, that is arranged over the hook, and the abutment which abuts the depending arm in a tilted position of the arm. This limitation of the tilting angle provides the advantage that the arms of the lower hanger part retain a slanting upwardly extending orientation whereby a pipe can be retained by gravity in the lower hanger part in the open state of the hanger without the risk that the pipe moves out of the hanger. The open pipe hanger with the pipe arranged does not have to be held by the user during installation and can be easily closed from there.

The invention will be further elucidated in the following description with reference to the drawings.

BRIEF DESCRIPTION OF THE DRAWINGS

FIG. 8 shows a view in perspective of the pipe hanger of FIG. 1 without a screw bolt, during closing of the hanger;

FIG. 9 shows another view in perspective of the pipe hanger of FIG. 8;

FIG. 10 shows a view in perspective of the hanger of FIG. 1, without a screw bolt, in a closed state;

FIG. 11 shows a front elevational view of another embodiment of a pipe hanger according to the invention in an open state; and FIG. 12 shows a view in perspective of a lower part of the pipe hanger of FIG. 11.

DETAILED DESCRIPTION OF THE INVENTION

Figure 1:
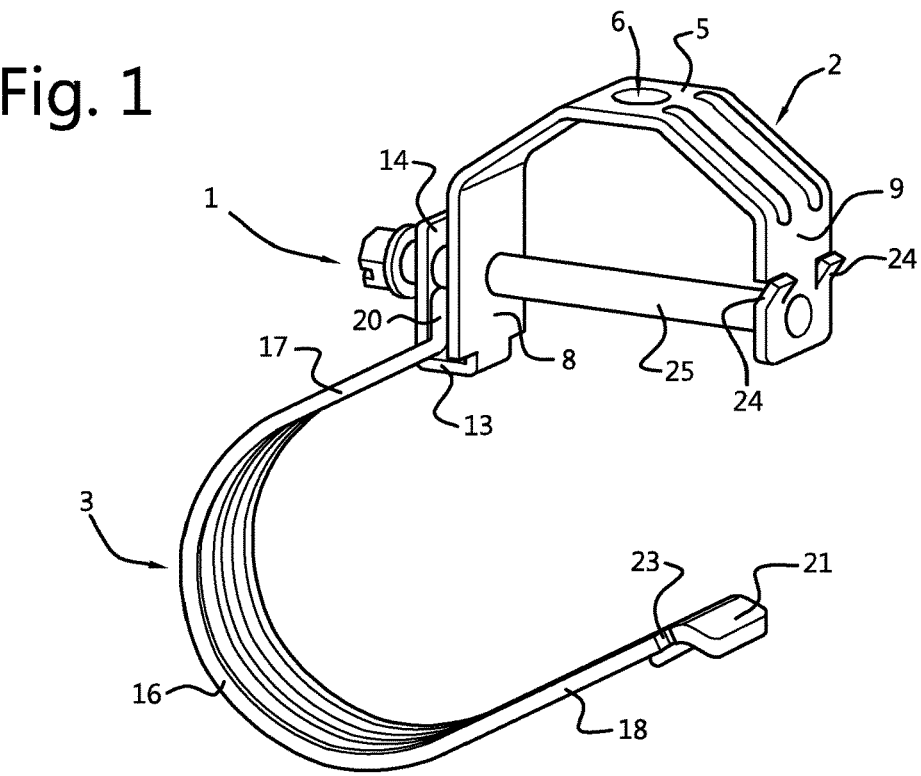
FIG. 1 shows a view in perspective of a preferred embodiment of a pipe hanger according to the invention in an open state.
Figure 2:
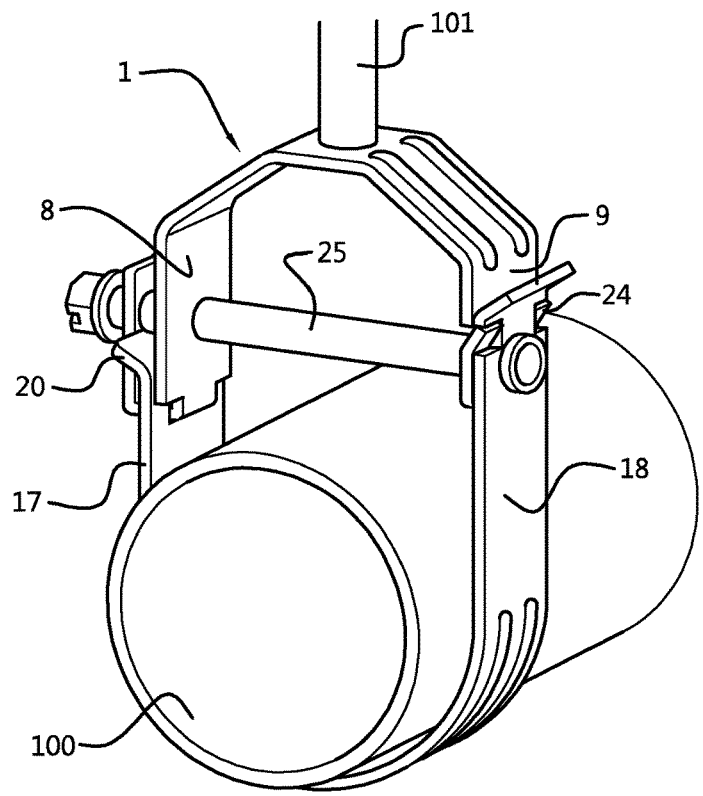
FIG. 2 shows a view in perspective of the pipe hanger of FIG. 1 in a closed state with a pipe installed in it.

FIGS. 1 and 2 show a pipe hanger 1, which is of the type that in the art is also referred to as a Clevis hanger. The pipe hanger 1 is shown in FIG. 1 in an open state in which a pipe can be placed in it. In FIG. 2 the pipe hanger 1 is shown in a mounted end state in which the hanger is closed and a pipe is arranged in it.

Figure 6:
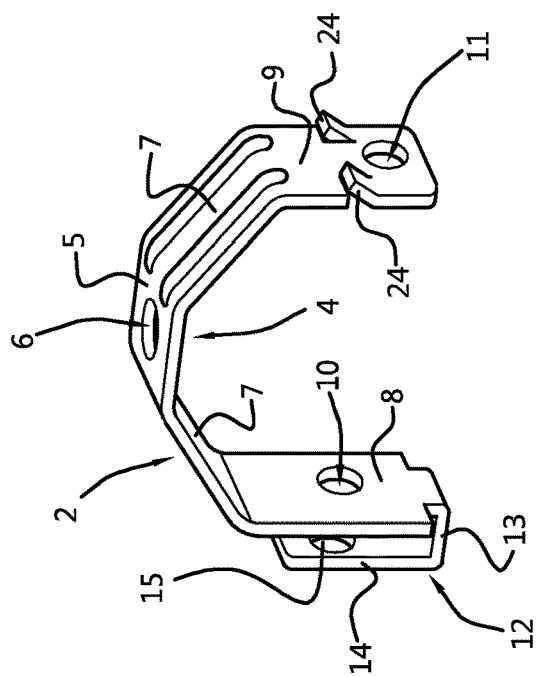
FIG. 6 shows a view in perspective of an upper part of the pipe hanger of FIG. 1.

The pipe hanger 1 comprises an upper hanger part 2 and a lower hanger part 3. The upper part 2 is separately shown in FIG. 6. The lower part 3 is separately shown in FIG. 5.

The upper hanger part 2 is generally U-shaped. It has a supporting portion 4 having a centre portion 5 in which an opening 6 is formed through which a threaded rod 101 (cf. FIG. 2) or another support device can pass to suspend the hanger from a ceiling or another overhead structure. The supporting portion 4 has also two inclined sections 7, which extend laterally and downwardly from the centre portion 5.

The upper hanger part 2 furthermore has depending arms 8 and 9 respectively extending downwardly from the respective ends of the supporting portion 4.

The depending arms 8 and 9 each have a bore 10 and 11 respectively formed in them. The bores 10, 11 are aligned with each other such that a locking bolt 25 can be passed through them (cf. FIGS. 1 and 2).

The depending arm 8 has a hook 12 formed at a lower end of the arm 8. The hook 12 has generally the shape of an "L", wherein the horizontal leg 13 of the L is connected to the lower end of the arm 8 and wherein the upwardly extending leg 14 of the L is spaced apart from the arm 8 and extends along it. Preferably the upwardly extending leg 14 of the hook 12 extends parallel to the arm 8.

The upwardly extending leg 14 of the hook 12 has a bore 15 formed in it which is aligned with the bores 10 and 11 in the depending arms 8 and 9, such that the shank of the bolt 25 can pass through.

The depending arm 9 has barbs 24 formed at lateral edges of the arm 9. The barbs 24 extend outwardly The lower portion 3 of the hanger 1 is generally U-shaped (cf. FIG. 5) and has a saddle portion 16 for supporting a pipe 100 (cf. FIG. 2) and arms 17 and 18 respectively extending upwardly from the saddle portion 16.

In the upper end portion of the arm 17 a hook aperture 19 is formed which can be hooked around the hook 12 of the upper part 2. The hook aperture 19 has a shape which conforms to the cross sectional contour of the hook 12, in the embodiment shown a rectangular shape.

Figure 3:
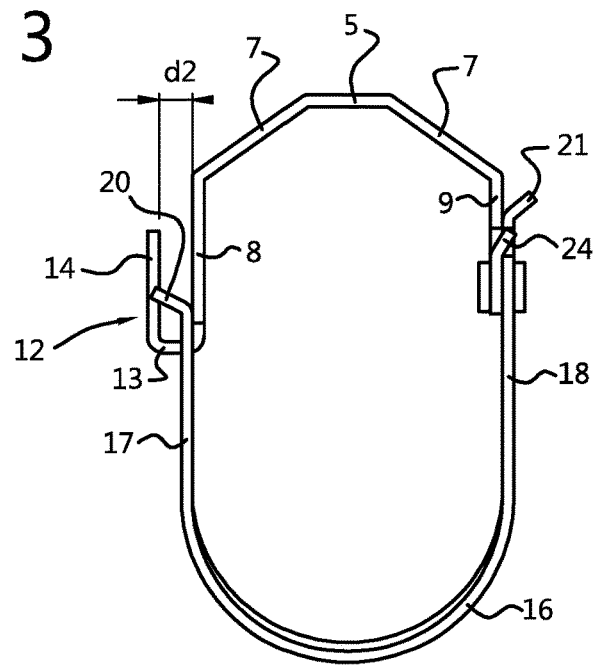
FIG. 3 shows a front elevational view of the pipe clip of FIG. 1 in a closed state.

There is a distance d1 (cf. FIG. 5) between an upper edge of the aperture 19 and a transition bend 27 between the upwardly extending arm 17 and the flange 20, which distance d1 exceeds the distance d2 (cf. FIG. 3) between the depending leg 8 and the upwardly extending leg 14 of the hook 12.

A flange 20 is formed at the end of the arm 17. The flange 20 extends under an obtuse angle α outwardly with respect to the arm 17. The angle α in the preferred embodiment is about 120°, but may be within the range 100° to 130°. The flange 20 serves as a rotation limiting flange as will be explained further below.

At a distal end of the flange 20 two protrusions 26 are formed which have a function during the closing of the hanger 1 as will be described further below.

A passage 22 is formed at the upper region of the other arm 18 of the lower hanger part 3, for passing through the shank of the bolt 25.

A flange 21 is formed at the end of the arm 18. The flange 21 extends under an obtuse angle β outwardly with respect to the arm 18. This inclined orientation of the flange 21 with respect to the arm 18 provides a guiding feature which facilitates the movement of the end of the arm 18 beyond the tip of the bolt 25 that extends through the hole 11 and protrudes slightly from the outer surface of the arm 9.

Just under the transition bend between the flange 21 and the arm 18 a pair of lateral recesses 23 is formed in the side edges of the arm 18. Each recess 23 is adapted to receive a barb 24 that is provided on the leg 9 of the upper part as will be described further below.

Figure 4:
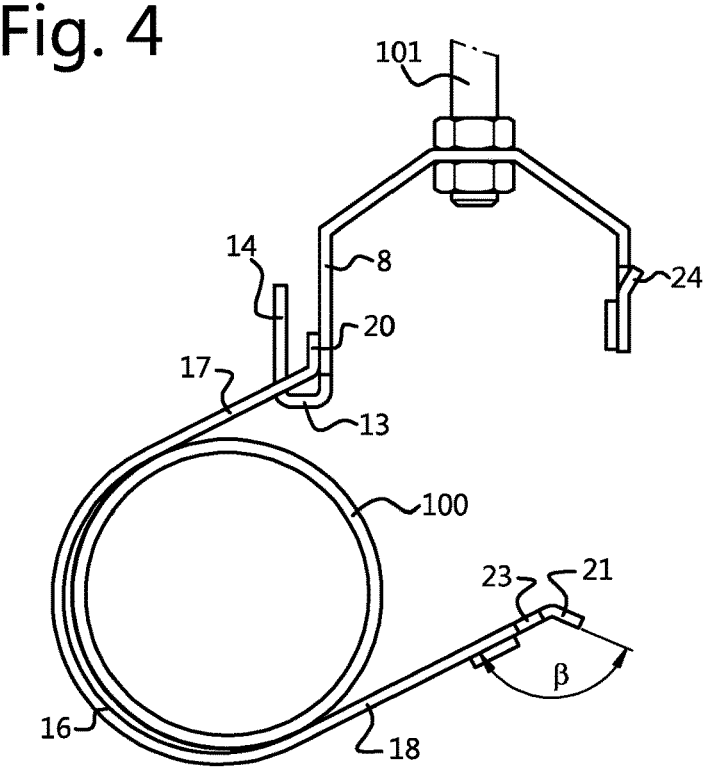
FIG. 4 shows a front elevational view of the pipe clip of FIG. 1 in an open state with a pipe arranged in it.
Figure 7:
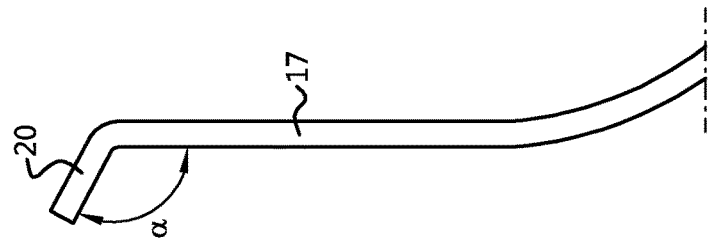
FIG. 7 shows a front elevational view of a detail of the lower hanger part of FIG. 5.

The upper hanger part 2 and the lower hanger part are assembled by moving the opening 19 over the hook 12. The lower part 3 can then suspend on the hook as is shown in FIGS. 4, 8 and 9. To finalise the assembly the bolt 25 is then inserted through the bores 10, 11 and 15 in the depending arms 8, 9 and the hook 12 respectively. The bolt 25 then locks up the upper end of the upwardly extending arm 17 of the lower part 3 on the hook 12. The bolt 25 is screwed into the bore 11 which is a threaded bore, to fix it to the upper part 2. The tip of the bolt 25 only protrudes to such an extent from the outer side of the arm 9 that corresponding arm 18 of the lower part 3 can still be moved to an overlapping position and the hanger 1 can still be closed. This is the state (cf. FIG. 1) in which the hanger 1 is preferably delivered to the user.

The hanger 1 can be mounted by the user to a threaded rod 101 or another suspension device to suspend the hanger from a ceiling or other overhead structure.

The hanger is initially hanging from the rod 101 in an open state as is shown in FIG. 1. The pipe 100 can then be laid in the lower part 3 of the hanger as is shown in FIG. 4. The weight of the pipe moves the of gravity of the lower part and pipe in the figure to the right. The flange 20 at a certain point abuts the outer face of the depending arm 8 as is shown in FIG. 4. Thereby the swiveling movement of the lower part is arrested and the arms of the lower part cannot tilt any further. Since the angle α is about 120°, the arms 17 and 18 can at most swivel about 60° whereby the arms 17 and 18 extend with an angle of about 30° with respect to the horizontal. This is a sufficient inclination to prevent the pipe from rolling out of the lower hanger part 3 in the open state.

From this state in FIG. 4 the hanger 1 can be readily closed by the user as is illustrated in FIGS. 8-10. The lower part 3 is tilted by moving the arm 18 upwards as is illustrated in FIG. 8 and FIG. 9. Next the arm 18 of the lower part 3 is moved along the corresponding depending arm 9 of the upper part 2 in an overlapping fashion until the barbs 24 engage the recesses 23. The pipe hanger 1 is now in a preliminary closed state. Finally the bolt 25 can be screwed further in the threaded bore 11 whereby the arms 18 and 9 of the lower part and the upper part respectively cannot be released from each other.

During the closing of the hanger 1 the upwardly extending hook portion 14 is received between the protrusions 26 on the flange 20. This provides for a better mutual alignment of the arms 18 and 9 at the opposite side of the hanger 1. Consequently the barbs 24 and the corresponding recesses 23 are then also better aligned, whereby a more reliable and easier closing of the hanger 1 is achieved.

In FIGS. 11 and 12 is illustrated another possible embodiment of a pipe hanger 1' according to the invention. The upper part 2 of this embodiment is the same as the upper part 2 shown in FIG. 6. For a description of the upper part 2 is thus referred to the above and the reference numerals are the same.

Figure 5:
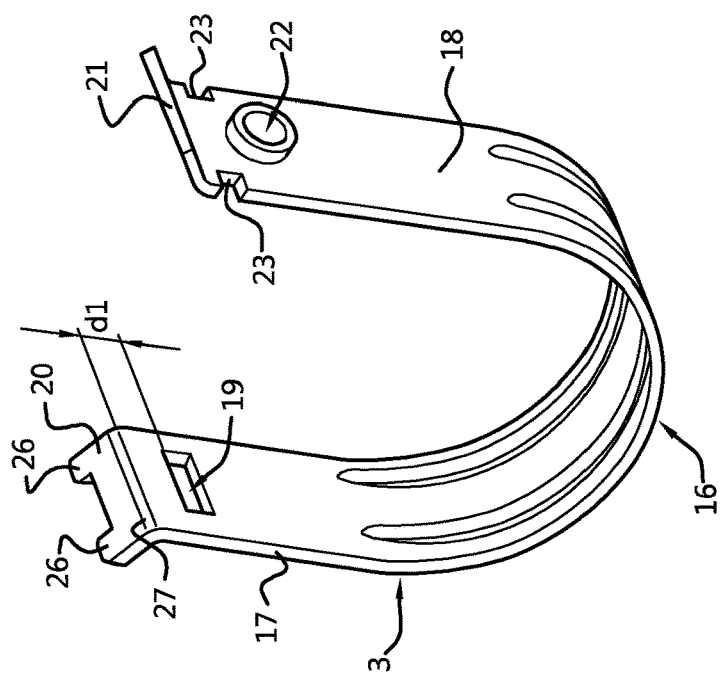
FIG. 5 shows a view in perspective of a lower part of the pipe hanger of FIG. 1.

The lower part 3' of this pipe hanger 1' is different from the lower part 3 shown in FIG. 5, in that it does not have a flange at the end of the upwardly extending arm 17 which is suspended on the hook 12. Instead an upper edge 17' of the upwardly extending arm 17 abuts the outer face of the depending arm 8 when the lower part is tilted to a certain extent with respect to the upper part, as is shown in FIG. 11. The upper edge 17' thus functions in this embodiment as an abutment that limits the tilt of the lower part 3'. The rest of the features are the same and therefore indicated by the same reference numerals as in FIG. 5. There is a distance d1 (cf. FIG. 12) between an upper edge of the aperture 19 and the upper edge 17', which distance d1 exceeds the distance d2 (cf. FIG. 11) between the depending leg 8 and the upwardly extending leg 14 of the hook 12.

In the open state (FIG. 11) a pipe 100 can be laid in the lower part 3' of the hanger 1'. The weight of the pipe moves the point of gravity of the lower part 3' and pipe. The upper edge 17' at a certain point abuts the outer face of the depending arm 8 as is shown in FIG. 11. Thereby the swiveling movement of the lower part 3' is arrested and the arms 17, 18 of the lower part cannot tilt any further. Closing of the pipe hanger takes place in the same manner as is described with reference to the embodiment of FIGS. 1-10.

The invention claimed is:

1. A pipe hanger comprising an upper hanger part, a lower hanger part and a locking bolt, said upper hanger part being adapted to be mounted to a support member and having depending arms each having a bore through which the locking bolt extends, and said lower hanger part having a saddle portion for supporting a pipe and arms extending upwardly from the saddle portion, wherein in a closed state of the pipe hanger the depending arms of the upper hanger part are coupled to the corresponding arms of the lower hanger part, wherein one of the depending arms of the upper hanger part has a hook formed on a lower end, and wherein the corresponding upwardly extending arm of the lower hanger part has an aperture formed in it that is arranged over the hook;

wherein the same upwardly extending arm of the lower hanger part has at its end a tilt limiting abutment, wherein in an open state of the pipe hanger the lower hanger part is only suspended from the hook and is allowed to swivel until the tilt limiting abutment abuts the corresponding depending arm of the upper hanger part; and wherein the other one of said upwardly extending arms of the lower hanger part has a bore for the locking bolt to lock the lower hanger part and upper hanger part in the closed position.

2. The pipe hanger according to claim 1, wherein the tilt limiting abutment is constituted by a flange that extends outwardly under an obtuse angle with the upwardly extending arm.

3. The pipe hanger according to claim 2, wherein the obtuse angle is within the range 100°-130°.

4. The pipe hanger according to claim 2, wherein the obtuse angle is around 120°.

5. The pipe hanger according to claim 2, wherein the tilt limiting flange has a distal end and two protrusions formed at said distal end, wherein in a closed state of the pipe hanger an upwardly extending hook portion is received between said protrusions.

6. The pipe hanger according to claim 1, wherein the hook has a transverse portion that extends from the depending arm of the upper part in a transverse direction and wherein the hook has an upwardly extending portion that extends upwardly from the transverse hook portion and is spaced apart from said depending arm, and wherein there is a distance between an upper edge of the aperture and the abutment, which distance exceeds the distance between the depending arm and the upwardly extending hook portion.

7. The pipe hanger according to claim 6, wherein the hook has generally an L-shape, wherein the end of the horizontal leg of the L is said transverse hook portion and is connected to the depending arm of the upper hanger part, and wherein the vertical leg of the L is said upwardly extending hook portion, which extends parallel to the depending arm of the upper hanger part.

8. The pipe hanger according to claim 7, wherein, when the tilt limiting abutment abuts the depending arm of the upper hanger part, the aperture in the corresponding upwardly extending arm is located at the angle of the L-shape.

9. The pipe hanger according to claim 6, wherein the upwardly extending hook portion is provided with a bore aligned with said bores in the depending arms, wherein the bolt extends through said aligned bores in the depending arms and the upwardly extending hook portion.

10. The pipe hanger according to claim 9, wherein at least two of the bores are threaded bores adapted to cooperate with a male thread on the shank of the bolt.

11. The pipe hanger according to claim 1, wherein the depending arm that opposes the depending arm where the hook is provided, has at least one outwardly extending barb, and wherein the corresponding upwardly extending arm of the lower hanger part has at least one recess to receive the at least one barb in a closed state of the hanger.

12. A pipe hanger comprising an upper hanger part and a lower hanger part, said upper hanger part being adapted to be mounted to a support member and having depending arms, and said lower hanger part having a saddle portion for supporting a pipe and having arms extending upwardly from the saddle portion, wherein in a closed state of the pipe hanger the depending arms of the upper hanger part are coupled to the corresponding arms of the lower hanger part, wherein one of the depending arms of the upper hanger part has a hook formed on a lower end, said hook having a transverse portion that extends from the depending arm of the upper hanger part in a transverse direction and having an upwardly extending portion that extends upwardly from the transverse hook portion and being spaced at a distance from said depending arm; and wherein the corresponding upwardly extending arm of the lower hanger part has an aperture formed in it that is arranged over the hook, wherein there is a distance between an upper edge of said aperture and an abutment located at the end of said upwardly extending arm, which distance exceeds said distance between the depending arm of the upper hanger part and the upwardly extending hook portion.

* * * * *